United States Patent [19]
Plank et al.

[11] 3,816,342
[45] June 11, 1974

[54] PROCESS FOR PREPARING A CRYSTALLINE ALUMINOSILICATE ZEOLITE

[75] Inventors: Charles J. Plank, Woodbury; Edward J. Rosinski, Almonesson, both of N.J.

[73] Assignee: Mobil Oil Corporation, New York, N.Y.

[22] Filed: July 31, 1968

[21] Appl. No.: 765,723

Related U.S. Application Data

[62] Division of Ser. No. 280,421, May 14, 1963, abandoned.

[52] U.S. Cl.............. 252/455 Z, 208/111, 208/120
[51] Int. Cl............................................. B01j 11/40
[58] Field of Search............ 208/111, 120; 252/455, 252/455 Z

[56] References Cited
UNITED STATES PATENTS

| | | | |
|---|---|---|---|
| 2,962,435 | 11/1960 | Fleck et al. | 208/119 |
| 3,140,249 | 7/1964 | Plank et al. | 208/120 |
| 3,140,253 | 7/1964 | Plank et al. | 208/120 |
| 3,173,854 | 3/1965 | Eastwood et al. | 208/111 |
| 3,198,729 | 8/1905 | Payne | 208/168 |
| 3,236,761 | 2/1966 | Rabo et al. | 208/111 |
| 3,298,780 | 1/1967 | Fleck | 208/111 UX |
| 3,402,996 | 9/1968 | Maher et al. | 252/455 |

*Primary Examiner*—Delbert E. Gantz
*Attorney, Agent, or Firm*—Andrew L. Gaboriault; Claude E. Setliff; Raymond W. Barclay

[57] ABSTRACT

A method is provided for fluid catalytic cracking of hydrocarbons characterized by a composite catalyst of highly active crystalline aluminosilicate and a relatively less active matrix material.

15 Claims, No Drawings

PROCESS FOR PREPARING A CRYSTALLINE ALUMINOSILICATE ZEOLITE

CROSS REFERENCES TO RELATED APPLICATIONS

This application is a divisional application of Ser. No. 280,421 filed May 14, 1963 now abandoned which carries forward disclosure from and was copending with applications:

Ser. No. 210,215 of July 16, 1962, now abandoned,

Ser. No. 215,272 of Aug. 7, 1962, now abandoned,

Ser. No. 215,291 of Aug. 7, 1962, now abandoned, the latter three of which are all continuations-in-part of application Ser. No. 42,284 of July 12, 1960, now U.S. Pat. No. 3,140,249.

Ser. No. 466,096 of June 22, 1965, now U.S. Pat. No. 3,271,418 of Sept. 6, 1966, which, in turn, is a continuation-in-part of one or more of the following applications:

Ser. No. 159,626 filed Dec. 15, 1961, now abandoned, which, in turn, was a continuation-in-part of Ser. No. 42,284.

Ser. No. 161,237 filed Dec. 21, 1961, now abandoned, which, in turn, was a continuation-in-part of said Ser. No. 42,284 now U.S. Pat. No. 3,140,249, Ser. No. 195,430 filed May 17, 1962, now U.S. Pat. No. 3,436,357, which, in turn, was a continuation-in-part of said Ser. No. 42,284, now U.S. Pat. No. 3,140,249, said Ser. No. 195,430 having issued as U.S. Pat. No. 3,436,357 on Apr. 1, 1969, Ser. No. 210,215 above referred to Ser. No. 242,594 filed Dec. 6, 1962, now abandoned, which was a continuation-in-part of said Ser. No. 42,284, now U.S. Pat. No. 3,140,249, Ser. No. 242,648 filed Dec. 6, 1962, now abandoned, which was a continuation-in-part of said Ser. No. 42,284, now U.S. Pat. No. 3,140,249, Ser. No. 380,015 filed July 2, 1964, now abandoned, which was a continuation-in-part of said Ser. No. 42,284, now U.S. Pat. No. 3,140,249, Ser. No. 348,318 filed Feb. 6, 1964, now abandoned, which was a division of said Ser. No. 210,215 filed July 16, 1962, Ser. No. 380,986 filed June 30, 1964, now abandoned, which, in turn, was a continuation-in-part of said Ser. No. 42,284 filed July 12, 1960, now U.S. Pat. No. 3,140,249, Ser. No. 380,665 filed July 6, 1964, which, in turn, was a continuation-in-part of Ser. No. 364,301 filed May 1, 1964, and issued as U.S. Pat. No. 3,140,253 on July 7, 1964, Ser. No. 186,794 filed Apr. 11, 1962, now abandoned, Ser. No. 251,025 filed Jan. 14, 1963, now abandoned, Ser. No. 251,026 filed Jan. 14, 1963, which was a continuation-in-part of application Ser. No. 49,284 filed July 12, 1960, Ser. No. 256,837 filed Feb. 7, 1963, now abandoned.

The present invention relates to catalysts and catalyst compositions and to their manufacture and use. More specifically, the present invention relates to fluid catalysts, methods for making fluid catalysts having superior properties, and processes employing fluid catalysts.

A wide variety of fluid catalysts are presently available and these generally comprise finely divided particles of catalytically active material capable of being suspended in a stream of fluidizing medium. It has been found that a large number of chemical reactions can be promoted or their efficiency improved by contact with a fluidized bed of such particles.

A number of properties contribute to the successful use of finely divided catalysts in the form of a fluidized bed. Among the more important properties are attrition resistance, uniform porosity, easily controlled particle size, a satisfactory level of catalytic activity and stable catalytic properties.

Fluid catalysts has been applied to a wide variety of chemical reactions involving both inorganic and organic reactants and has been found to be especially useful in the petroleum industry where such techniques have been employed to accomplish reforming, isomerization, hydroprocessing, and cracking or conversion. The catalysts of the present invention have general application in fluid catalytic processes and have outstanding utility in the conversion of petroleum feed stock.

Fluid catalytic processes have been developed for use in the conversion of hydrocarbons and for conducting other reactions with petroleum derived materials, such as reforming, isomerization and hydroprocessing. While conventional techniques have been generally satisfactory, research has continued for the purpose of improving the fluid catalysts, the methods for making fluid catalysts, and the process by which they are employed.

It has now been discovered that catalysts exist which have extremely high activities, especially for the conversion of hydrocarbons. The order of the activities of the new catalysts is actually so high that conventional cracking processes and apparatus cannot take full advantage of their high activity. It has been found, however, that by certain methods the activity of such catalysts may be lowered to a level at which their use in conventional cracking systems is satisfactory and, in fact, results in a considerable increase in the efficiency of standard processes. In addition, new techniques have been developed to take full advantage of the higher activities available in such catalysts.

Accordingly, it is a primary object of this invention to provide new fluid catalysts having outstanding activity and having improved physical properties.

Another object of the invention is to provide new highly active fluid catalysts comprising crystalline aluminosilicates.

A further object of the present invention is to provide methods for producing superactive fluid catalysts having good attrition resistance and controlled particle size and density.

An additional object of the invention is to provide highly active fluid catalysts which are especially useful in hydrocarbon cracking systems and which exhibit excellent selectivity, reduced coke-forming tendency and good reactor and regenerator stability.

Another important object of the present invention is to provide methods for producing and utilizing the new fluid catalysts of the present invention.

The manner in which the above objects and many other highly desirable objects and advantages are achieved will become apparent in the light of the following detailed description of the present invention.

As earlier mentioned, the catalysts of this invention have such extraordinarily high activity that their full utility in conventional hydrocarbon conversion processes cannot be realized. When such catalysts were subjected to conventional tests to determine their effectiveness for hydrocarbon conversion, the initially appeared to be relatively worthless. However, it was later discovered that this was due to the superactivity of the catalysts. Newly developed testing methods then showed that when such catalysts are subjected to additional treatments, which would normally reduce the activity of a conventional catalyst, the new catalysts actually become highly useful for hydrocarbon conversion.

The standard catalyst evaluation test widely established and used for the evaluation of hydrocarbon cracking catalysts, both for preliminary evaluation and for control during commercial use by examination of activity, is one known as the CAT-A test. In this test, a specified Light East Texas gas oil is cracked by passage over the catalyst in a fixed bed at a liquid hourly space velocity (LHSV) of 1.5 using a catalyst/oil ratio of 4/1 at an average reactor temperature of 800°F and under atmospheric pressure. The per cent of gasoline produced is the Activity Index (A.I.). When so tested, the fresh crystalline alluminosiliontes produce little gasoline and relatively large amounts of fixed gases and coke. As noted, this appeared to condemn them as catalysts for cracking hydrocarbons.

A new test capable of operation upon small quantities of charge and catalyst and under precision of control well beyond the capability of the CAT-A test and capable of tracing the course of reaction in successive time intervals and at precise temperature levels was therefore developed.

This test may be considered a micro method. The catalyst under investigation is placed in a refractory tube (Vycor, a commercial high silica glass as suitable) of about 8 mm outside diameter and is retained therein as a compact body by suitable porous plugs, such as of glass wool. This reactor tube is mounted in an electrically heated furnace. A suitable furnace would be one of about 1 inch internal diameter. With about 3 cc of catalytic material, the furnace would be about 6 inches long, and a reactor tube of about 12 inches length would be suitable. A thermocouple is inserted in the annular space surrounding the reactor, and the ends of the furnace are plugged with glass wool.

It will be recognized that the physical dimensions of this equipment are such that very close control of reaction temperature can be had. At either end of the reactor tube, a three-way valve is provided. To introduce reactant, an inert gas such as helium is bubbled through a body of liquid reactant to carry reactant into the reactor. The three-way inlet valve permits flushing before and after reaction, if desired, and also permits the introduction of the regenerative gases, if desired, after a reaction is investigated. The three-way valve on the outlet permits passing all of the effluent to a collection zone or permits diverting the effluent during a specified time interval, or at a specified temperature to sampling and analysis.

Chromatographic analysis of such samples permits a very rapid and close check upon the results of conversion with respect to many variables. The amounts of reactant carried in with the inert gas is controlled by the partial pressure of the reactant at the temperature of the reactant supply vessel and by the flow rate of the gaseous carrier and arrangement may be made to control the temperature of the reactant supply.

In the investigation of the highly active crystalline alumino-silicate materials by the previously described method, hexane was selected as the reactant and helium gas, introduced at 20 cc per minute, as the inert carrier gas. The helium and hexane were maintained at room temperature and atmospheric pressure.

When examined according to the foregoing method, the crystalline aluminosilicates were found to have very surprising levels of activity which were far beyond any previously thought possible.

For example, when a specific rare earth exchanged synthetic crystalline alluminosilicate having the crystalline structure of faujasite was tested with hexane in this manner at an LHSV of 0.5 and at a partial pressure in the vicinity of about 150 mm at a temperature of 240°C (465°F) for a period of 10 minutes, about 20 percent of the hexane was converted. In contrast, over an amorphous silica-alumina catalyst of conventional type and having an A.I. of about 46, according to the CAT-A test, substantially no conversion of hexane can be detected until temperatures on the order of 500°C (930°F) are reached. An examination of the reaction rate and of the temperature relations involved leads to the conclusion that the reaction velocity constant over the crystalline aluminosilicate is on the order of up to 10,000 to 15,000 times as great as that over conventional amorphous silica-alumina gel catalysts.

Examination of a fairly wide spectrum of crystalline aluminosilicate materials has led to the conclusion that the noted activity capability is actual and not imagined. Many crystalline aluminosilicate materials were tested and were found to have comparable high activities. Further, the test results have been found to be reproducible. Similar tests conducted with decane confirm the results, and these results correlate with other catalytic capabilities of the substances and are capable of correlation with general knowledge of catalytic processing.

The materials, which display the previously described super-activity, all partake of the general nature of crystalline aluminosilicate materials of both natural and synthetic origin.

Generally, the crystalline aluminosilicate materials with which this invention is concerned have the following general formula:

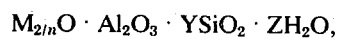

$$M_{2/n}O \cdot Al_2O_3 \cdot YSiO_2 \cdot ZH_2O,$$

in the salt form, wherein n is the valence of the metal cation M, Y is the number of moles of silica, and $ZH_2O$ is the water of hydration.

Crystalline aluminosilicates of the above structure, sometimes referred to as crystalline zeolites or molecular sieves, may be activated by removal of the water of hydration and when so activated, they possess sites capable of promoting catalytic conversions. Upon dehydration, the aluminosilicates are found to be highly porous and possess numerous surface cavities and internal pores connecting the cavities. These pores are of substantially constant diameter, generally in the range of from 3 to 13 Angstroms, the exact size depending upon the composition and structure of the specific aluminosilicate.

In order to modify the properties of such materials, the original cations of the aluminosilicates, usually sodium, potassium, and/or calcium, may also be changed by processes of ion-exchange. Ion-exchange of the original ions has been found to have an especially beneficial effect on the catalytic cracking properties of the crystalline aluminosilicates.

Suitable crystalline aluminosilicates for use in the production of the fluid catalysts of the present invention include both natural and synthetic crystalline aluminosilicates or zeolites.

A fairly wide variety of natural crystalline zeolites exist and, among these, faujasite has been found to be an especially useful material for the preparation of the catalysts of this invention. Other satisfactory natural crystalline zeolites include, for example, analoite, paulingite, clinoptilolite, ferrierite, chabazite, gmalinite, levynite, erionite, and mordenite.

Among the most suitable synthetic crystalline aluminosilicates are the synthetic faujasites, including both X and Y types which have a crystal structure corresponding to that of natural faujasite. The preparation of such X aluminosilicates is descirbed in U.S. Pat. No. 2,882,244 Milton issued Apr. 14, 1959. The preparation of the Y type is described in Belgian Pat. No. 577,642.

Another important synthetic crystalline zeolite not having a corresponding natural form is Zeolite A. The preparation of this crystalline aluminosilicate is described in U.S. Pat. Nos. 2,882,243 Milton and 2,982,612 Barrer et al.

Other suitable synthetic crystalline zeolites useful in the present invention include, for example; Y zeolite, B zeolite, D zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, W zeolite, Z zeolite, and others.

Since the natural crystalline aluminosilicates are not all available in abundance, the synthetic zeolites are more often employed as starting materials for the preparation of catalysts in accordance with the present invention.

For example, highly useful crystalline aluminosilicate catalysts may be prepared by subjecting sodium X molecular sieve to ion exchange with a solution of rare earth chlorides until the sodium content is reduced to about 1.0 – 1.5 percent by weight of sodium and until about 25 percent by weight of rare earth ions calculated as $RE_2O_3$ is introduced.

The various forms of synthetic crystalline aluminosilicate are also sometimes identified by numerical prefixes, as for example 4A-, 5A- and 13X-zeolite. The 4A and 5A materials are zeolites of crystalline structure A and have a pore size of about 4A and 5A diameter respectively. A 13X material is one having an X crystalline structure and a pore size of about 10A diameter.

The aluminosilicate materials may also be converted to the H or acid form in which hydrogen ions occupy the cation sites. For example, such a conversion may be had by ion-exchange with an ammonium ion followed by heating to drive off $NH_3$ or by controlled acid leaching with a hydrochloric acid solution or like reagent. In general, the H form is more stable in materials having $SiO_2/Al_2O_3$ of 3.5 or higher. Useful catalysts are also produced by a combination of ion-exchange treatments. For example, the crystalline aluminosilicates may be converted to the H or acid form by acid leaching and then may be ion-exchanged with a solution of rare earth salts to produce catalysts such as rare earth-hydrogen exchanged mordenite, rare earth - hydrogen exchanged synthetic faujasite of X or Y type and many other useful ion-exchange catalysts. It will also be apparent that more than one type of metal cation may be used to ion-exchange the crystalline aluminosilicates and that the sequence of ion-exchange treatments may be varied. For example, acid leaching to substitute hydrogen ions may precede or follow ion-exchange treatment to substitute metal cations.

For the purpose of comparing the present superactive catalysts with conventional catalysts, a scale has been developed which is based on the conversion activity of conventional amorphous silica-alumina (10 percent alumina) gel cracking catalyst having an A.I. measured by the CAT-A test of approximately 46. This conventional cracking catalyst is assigned a relative conversion activity, $\alpha$, equal to unity. Many of the superactive aluminosilicates of the present invention have been found to have an $\alpha$ value on the order of about 2,000 and above.

As previously noted, once the availability of an entire class of catalysts having extraordinarily high activity was discovered, attention was then directed towards methods for controlling the activity of such material so that they might be employed in presently available catalytic systems which represent such a tremendous financial commitment on the part of the petroleum industry and other chemical industries.

Although it is fully anticipated that new processes and systems will rapidly come into use which will take advantage of the high activities of the crystalline aluminosilicate catalysts. The initial emphasis has been placed on adapting them to conventional technology.

This line of investigation has led to the discovery that the extremely high activities of the crystalline aluminosilicate may be modified by compositing the crystalline aluminosilicate component with a less active or inert material, by steaming, by exchanging the original metal cations, usually sodium, potassium and calcium, with other metal cations or hydrogen ions, and by calcining.

A preferred method for reducing the activity of the aluminosilicate catalysts is by compositing the aluminosilicate with a matrix material which is relatively inactive. The term "relatively inactive" is here used to define materials which have catalytic properties in the conventional range of $\alpha \cong 1$ or materials which are less active. Thus, for example, a rare earth aluminosilicate having an activity on the order of $\alpha \cong 2,000$ or higher may be reduced to an activity level useful in current cracking technology by incorporating about 3 – 15 percent of such aluminosilicate in a matrix of amorphous silica-alumina gel having an activity on the $\alpha$ scale of unity and then steam treating.

Obviously, by this method of preparation, a diluent matrix material of various levels of activity may be used and any amount of the highly active material may also be employed to give the desired level of activity in the final catalyst. Among suitable matrix materials that may be incorporated into such composite catalysts are inorganic oxide gels, such as those of silica, zirconia, alumina, magnesia and combinations thereof with one another, clays, alumina, metals and refractory materials.

As a variant on the above method of compositing to reduce the activity of crystalline aluminosilicate catalysts, the active crystalline aluminosilicate component, in finely divided form, may be mixed mechanically with finely divided particles of less activity, such as sand and other silicas and silicaceous materials other than sand, metal oxides, clays or other relatively inactive components. Since the frequency of contact between reactants and catalyst in a fluidized bed in a statistical matter, the incidence of contact between the highly active aluminosilicate particles and the reactants may be controlled on average by the addition and mixing of the desired proportion of relatively inactive particles into the same fluidized bed with the crystalline aluminosilicate catalyst particles.

It has also been found that the activity of the crystalline aluminosilicate catalysts under consideration may be reduced by a process of steam treating and that controlled steaming can be utilized to produce catalysts having any desired degree of activity. The degree of steaming of a specified catalyst to achieve a desired activity level is largely dependent upon the nature of the catalytic material.

For example, the crystalline aluminosilicate catalyst may be treated in an atmosphere containing from about 5 to 100 percent steam, at temperatures of from about 500°F to 1,600°F and under pressures ranging from sub-atmospheric to several hundred atmospheres, until the desired modification of the properties of the catalyst is achieved.

Cations which may suitably be used to replace the original cations of a crystalline zeolite by ion-exchange procedures to modify their catalytic properties may include the following, by way of example: Pa, Ca, Ce, Li, Mg, Ag, Sr, Zn, La, Pr, Nd, Pm, Sm, Eu, Cd, Tb, Dy, Mo, Er, Ta, Yb, Lu, Mn, Be, Ti, Zr, Hf, V, Cr, Fe, Co, Ni, Cu, Cd, Al, Sn, Pb. For example, a relatively small amount of polyvalent metal cations markedly improves the structural stability of the crystalline aluminosilicate into which it has been introduced, particularly with regard to the thermal and steam stability of the material.

As an example of activity control by ion-exchange, a crystalline aluminosilicate of the 13X type may be base exchanged with a mixture of rare earth chlorides as above-described to produce a rare earth aluminosilicate having about 20–25 percent rare earth ion content calculated as $RE_2O_3$. This material, when freshly prepared, has a very high relative activity, but by controlled steaming, for example, by treating in an atmosphere of steam for 5 to 40 hours at 1,300°F, the relative activity of this material can be reduced to more useful levels.

The natural and synthetic crystalline aluminosilicates comprise a network of $SiO_4$ and $AlO_4$ tetrahedra which are cross-linked by the sharing of oxygen atoms. The electrovalence of the tetrahedra is balanced by inclusion in the crystal of a cation, ordinarily a metal ion such as Na, K or Ca.

The original metal ion may be partially or fully replaced with other metal cations by various ion-exchange techniques. Alternatively, the original cations may first be converted or partially converted to the acid form and then exchanged with other metal cations. The relative concentrations of the reagents and of the material being treated, the size of the particles and the conditions of reaction may all be varied to obtain desired degrees of replacement or ion exchange.

Thus, the nature and extent of exchange of a particular metal cation into the aluminosilicate complex also influences the relative conversion activity of the catalyst. Divalent cations, such as calcium ions, are known to confer specific properties when incorporated by ion exchange.

It has also been found to be possible to modify the properties of crystalline aluminosilicates by calcining, i.e., by heating at high temperatures but below the sintering temperature of the specific aluminosilicate, for varying periods of time.

It is also possible to produce crystalline aluminosilicates of suitably reduced activity of a combination of the foregoing methods. For example, a sodium Y aluminosilicate material may be base exchanged with a mixture of calcium and hydrogen ions to produce a calcium-hydrogen Y zeolite having a relatively high $\alpha$ value. Then the activity of this material may be reduced by matrix dilution or compositing, as described above, to produce a final catalytic material having a relative conversion activity of about twice that of the original Na Y and suitable for use in existing cracking processes.

Having described in some detail the nature of the crystalline aluminosilicate catalysts used in the present invention and the various techniques by which their activities may be modified and brought to levels suited for use in conventional catalytic conversion systems, there will now be disclosed various methods which have been discovered for the preparation of such catalysts for use in fluid catalytic processes.

By fluid catalytic processes, reference is made to methods in which a chemical or physical process is initiated or its efficiency is enhanced by contact with finely divided catalyst particles suspended in a fluidizing medium. Taking the process of hydrocarbon conversion as an example, hydrocarbon feed material is cracked to hydrocarbon products of lower average molecular weight by suspending particles of catalytic material in a stream of hydrocarbon vapors under conversion conditions of temperature and pressure.

It is essential, therefore, that the particle size of fluid catalytic material be such that the particles can be suspended in the fluidizing medium. While the exact size of the particles will vary depending on the conditions of the reactor and the nature of the charge undergoing conversion, particles having a size of from about 20 to 200 microns are generally satisfactory for suspension in fluidized beds.

Since particles of different size will be affected differently by the same stream of fluidizing agent, it is highly desirable that the fluid catalyst particles be of relatively constant particle size. Otherwise, the finer particles will be too easily fluidized and will rapidly separate from the larger particles which will tend to collect in the dense phase. Thus, it is very desirable that the catalysts be formed by a method which permits close control of particle size and density.

By the same token, resistance to attrition or disintegration is also an important characteristic of fluid catalyst particles. If the particles have the tendency to break down easily during fluidization and transport throughout the particular system, a large amount of fines will be formed which will have to be removed from the system and which will require constant replacement. The necessity for maintaining a large catalyst inventory to replace particles lost through attrition sharply reduces the economy of processes utilizing such catalysts.

Without delving too deeply into the theory underlying the catalytic activity of crystalline aluminosilicates, it is generally accepted that their activity is related to the crystalline structure of the particular material. Accordingly, it is highly desirable that any process utilized for the formation of fluid catalysts comprising such materials should preserve the ordered or crystalline structure of the material so that its activity will not be impaired.

It is also desirable to have the capability for producing fluid catalyst particles of controlled size and density so that the characteristics of fluidized beds of such particles will be as uniform as possible.

Other valuable properties of fluid catalysts, especially of fluid catalysts to be used in hydrocarbon cracking systems, are good thermal and steam stability under regeneration conditions, good conversion activity, stability in the reactor, and high product selectivity.

The preferred method for producing fluid catalysts according to the present invention comprises composing a superactive crystalline aluminosilicate component with a relatively inactive matrix component. Several satisfactory methods for making composite fluid catalysts have been developed and such methods generally comprise incorporating finely divided particles of aluminosilicate into a matrix component which preferably is an inorganic oxide gel, such as a silica-alumina gel.

One preferred method for producing highly active fluid catalysts comprising crystalline aluminosilicate components comprises the following general steps:

a. Preparation of the Aluminosilicate Component

A suitable crystalline aluminosilicate is selected for incorporation into the matrix component. While for the preparation of some catalysts, the crystalline aluminosilicate may be employed in an unmodified condition, it is ordinarily treated to modify its properties, especially where the final catalyst is to be used for hydrocarbon conversion.

A preferred starting material for the production of the present catalysts is a synthetic faujasite of the X type. This catalyst may be ion-exchanged by contact with a solution of rare earth chlorides to remove at least about 75 percent of the sodium ion content of the original sieve.

The catalytic properties of the material may be further modified by steam treating at this point.

It has also been found that the crystallinity retention of catalysts produced in accordance with this invention may be improved by pre-calcination of the crystalline aluminosilicate. For example, where the crystalline aluminosilicate is to be dispersed in a relatively inactive matrix material such as silica-alumina gel, it has been found possible to preserve the crystallinity of the aluminosilicate, such as rare earth exchanged synthetic faujasite by calcining it to drive off water, thus forming a more stable structure and minimizing loss in crystallinity during subsequent rapid drying as in spray drying, wet processing, steaming and aging. The calcining may be accomplished by heating the crystalline aluminosilicate sieve after ion exchange to a temperature below the sintering temperature of the sieve and generally in the range of from 500°F. to 1,600°F.

The pre-calcination of the crystalline aluminosilicate may also be accomplished by high temperature spray drying of the aluminosilicate particles after formation. For example, wet, rare earth ion-exchanged particles of synthetic faujasite may be pre-calcined by being spray dried into a current of air having an inlet temperature of 1,000°F and an outlet temperature of 475°F. Other pre-calcination techniques include calcining the crystalline aluminosilicate for periods of about 3 hours at 1100°F in air or in an atmosphere of steam at 15 psig.

Particles of the resulting rare earth exchanged crystalline aluminosilicate having a weight mean particle diameter of up to about $40\mu$ may then be slurried in water preparatory to formation of the composite catalyst.

b. Preparation of the Matrix Gel-Forming Solutions

In general, gels may be prepared by neutralizing solutions of salts of gel-forming oxides. In a preferred embodiment of this invention, a matrix of silica-alumina gel is employed. This is ordinarily prepared by neutralizing a solution of sodium silicate with an acid solution. The acid solution may also contain a salt, such as aluminum sulfate, which provides the alumina content of the gel. Therefore, as a preliminary to formation of the gel, gel-forming solutions are first prepared. The gel-forming solutions for use of a the production of silica-alumina gel generally comprise an aqueous solution of sodium silicate and an aqueous solution containing an acid and aluminum sulfate.

The matrix may also be prepared by other methods disclosed in the patent literature, as for example, by those methods described in U.S. Pat. Nos. 2,701,793; 2,859,184; 2,941,961; 3,003,951 and 3,023,172.

The matrix material may also be treated so as to make it more susceptible to deactivation by steam. This may be done by forming a matrix having a high silica-to-alumina ratio since such materials are more readily deactivated by steam. The susceptibility to deactivation by steam treatment of the matrix may also be increased by leaving a relatively large amount of sodium in the silica-alumina gel.

The activity of the matrix may also be reduced prior to combination with highly active aluminosilicate component by incorporating catalytically inert fines into the matrix.

Rather than having to steam temper the product to reduce the activity of the matrix, as in the method described above, it may be preferable to use a matrix of low activity making steaming unnecessary. Suitable matrix materials having very low activities include clays, aluminas, hydrated metal oxides, silica gel, alumina gel, thoria gel, alkaline earth oxide - silica gels, cerium or rare earth gels or precipitates, zirconia gel, hafnia gel, tin oxide gel, titania gel, etc.

c. Introduction of Crystalline Aluminosilicate Component Into Gel-forming Solutions According to the present method of catalyst production, it is generally preferable to introduce the crystalline aluminosilicate component by adding a slurry of aluminosilicate particles to the gel-forming solutions. Usually the addition is made to the sodium silicate solution with continuous agitation to maintain the particles in a thoroughly dispersed condition.

The addition of superactive crystalline aluminosilicate particles may also be made to the acid solution or to the silicate and acid solutions after they have been mixed, but before the gel has formed.

According to the preferred method, it has been found highly desirable to add fines to the hydrogel-forming solutions. Recycle fines recovered from a spray drying unit or from the catalytic reactor itself are suitable for this purpose. These fines are preferably ground to a weight mean particle diameter of from 2 to 7 microns and may be slurried in water with the crystalline aluminosilicate particles prior to combination with the gel-forming solutions. The addition of the recycle fines in this manner has been found to improve the hardness and increase the density of the fluid catalyst particles formed by spray drying. In addition, it represents a definite economy in the over-all production of the catalyst by eliminating waste in the form of fines which may be produced at any step of the method, whether during grinding, spray drying or some other processing operation.

The fines added to the aluminosilicate and matrix gel may be of a size up to about 40 microns weight mean particle diameter. Special advantage may be gained also by the addition of fines below about 7 microns and preferably in the size range of from 0.3 to 3.0 microns.

For improved attrition resistance and higher diffusivity of the product, other fine solids may also be incorporated in the matrix, such as dried silica-alumina, other oxide gels, clays, metal salts, such as barytes, etc. The added fines and active components together will generally comprise roughly between 5 and 50 percent by volume and preferably between 15 and 30 percent by volume of the final product.

The inclusion of fines, while desirable in many instances, is not essential in all cases. Catalysts of the type in question have been produced without the addition of recycle lines with excellent results.

It has also been found that good results may be obtained by utilizing a matrix hydrogel, for example, a silica-alumina hydrogel, which has a pH adjusted to the range of from about 6 to 11 and preferably in the range of from about 7.0 to 10.0. The pH may be adjusted by adding alkalis, such as sodium hydroxide, ammonium hydroxide, calcium oxide or calcium hydroxide, magnesium oxide or magnesium hydroxide, etc., if the matrix is too acid. If the matrix hydrogel is too alkaline, acids or acid salts such as ammonium chloride can be used. The hydrated matrix may be washed substantially free of soluble salts and its sodium content should be less than 0.5 percent sodium (on a dry solids basis) and preferably less than 0.2 percent sodium.

The use of a high pH in the hydrogel matrix prior to spray drying has been found to open up the structure of the matrix and to improve the physical properties of the catalyst.

d. Bead Formation

The slurry of aluminosilicate particles and fines, if fines are used, is then dispersed in the matrix gel-forming solutions which are mixed and are set to a hydrogel having the aluminosilicate particles dispersed within. The hydrogel formation may be carried out by forming the mixed gel-forming solutions and dispersed aluminosilicate particles into droplets and permitting the droplets to descend through a setting medium, such as an oil column. The acidity of the hydrogel is controlled to influence the properties of the product gel and to provide a set time so that the setting is completed during the progress of the droplets through the setting column.

After washing or scrubbing, the beads obtained in this manner may be subjected to further treatment, such as an additional ion-exchange treatment with rare earth chloride or ammonium solutions.

It has also been found desirable in some instances to reduce the density of the beads by including a heat-treating step either concurrently with or prior to the scrubbing. For example, the heat treating may be effected by maintaining the hydrogel beads in sluice water for 4 hours at a temperature of about 100°F to reduce the density of the product. Heat treating may also be carried out for varying periods of time at elevated temperatures.

e. Formation of Fluid Catalyst Particles

According to the preferred method, the beads are then beaten into water to form a paste or slurry in which particles of the composite are finely divided and thoroughly dispersed. This aqueous slurry is then preferably sprayed to form microspheres of the catalyst suitable for use in fluid catalytic operations.

The spraying of the catalyst forming slurries or solutions may be accomplished in a number of ways, such as by spray forming the droplets in air or by passing the sprayed droplets in concurrent flow, counter-current flow, semi-countercurrent flow or cycloflow with respect to a stream of drying gas.

Spray forming may be accomplished with or without drying. In either case, the spraying serves to form small spherical-shaped particles of the catalyst. Where substantial moisture is to be removed, spraying is usually done into a stream of heated drying gas.

In spray drying by a semi-countercurrent procedures the droplets are sprayed up into a chamber containing drying gas where the droplets are partially dried and then are permitted to cascade downwardly countercurrent to a rising stream of drying gas.

The drying fluid in the spray drying system may be superheated steam which tends to preserve the catalytic characteristics of the aluminosilicate.

f. Post-Forming Procedures

After the fluid catalyst particles have been produced by spray forming, spray drying or the like, it may be desirable to subject the particles to certain additional treatments. According to one preferred procedure, the composite catalyst particles may be steam treated. For example, if the composite particles comprise about 5 percent by weight of rare earth exchanged synthetic faujasite of the X type and 95 percent by weight of a silica-alumina gel matrix, the composite may be steam treated for 24 hours, at 1,200°F in 15 psi steam. Alternatively, steaming may be conducted for 16 hours at 1,300°F in steam at atmospheric pressure to achieve the desired modification in the catalytic properties of the product.

The previously described method may be better understood in the light of the following detailed examples, illustrating this method.

EXAMPLE 1

A slurry was prepared by adding 2.61 percent by weight of rare earth exchanged synthetic faujasite particles of the X type in which 90 percent of the original sodium ions were replaced by rare earth ions. The particles were of from 2 to 7 microns in diameter. To this slurry was added 17.39 percent by weight of recycled composite catalyst fines, ground to a particle diameter of 2 to 7 microns. The fresh crystalline aluminosilicate particles were added to and thoroughly dispersed in 80 percent by weight of water.

A solution was then prepared by dissolving 54.65 percent by weight of sodium silicate and 2.47 percent by weight of a sodium hydroxide in 42.88 percent by weight of water. A second solution was prepared by dissolving 3.29 percent by weight of $H_2SO_4$ (100 percent) and 5.80 percent by weight of $Al_2(SO_4)_3$ in 90.91 percent by weight of water.

The slurry of active particles including fresh aluminosilicate and recycled composite catalyst fines was then dispersed into the solutions in the following relative solution volumes 0.229 slurry, 0.853 sodium silicate solution, 1.000 acid-alum solution.

Droplets of the combination slurry and solutions were then passed through an oil setting column at a temperature of about 68°F. The gel time of the sol was 4.6 seconds.

The temperature at which the above solutions were formed ranged from 50°F to 55°F. and the resulting pH of the hydrogel was adjusted to from about 7.9 to 8.0.

The beads were then withdrawn from the oil column and were treated with a solution of 1.2 percent $(NH_4)_2SO_4$ for a period of about 2 hours at ambient temperature to remove oil from the surface of the beads.

The beads were then subjected to an ion exchange step by being contacted with an aqueous solution of 3.9 percent $(NH_4)_2SO_4$ for a period of about 4 hours at ambient temperature. This base exchange cycle was repeated five times with the beads being subjected to the steady flow of the treating solution for 75 percent of each 4 hour cycle.

The beads were then washed with water for cycles of 4 hours duration and each cycle was repeated 5 times.

The beads were next ground into a paste with water to a solids content of from 5 to 10 percent by weight and were then spray dried in conventional spray drying equipment. The inlet temperature of the air in the spray drier was from 800°F to 1,000°F., and the outlet temperature in the air was from 350°F. to 400°F. The product of the spray drying was in the form of microspheres having a moisture content in the range of from 10 to 15 percent by weight.

The microspheres were next steam tempered by exposure to 100% atmosphere of steam at a temperature of 1,300°F. for a period of 16 hours.

EXAMPLE 2

Solutions and slurries were prepared in the following manner:
1. 19.25 lbs. of sodium silicate (N brand - 28.9 wt. percent $SiO_2$) were dissolved in 9.70 lbs. of water and 1.73 lbs. of clay (87 percent solids) were then dispersed in this solution,
2. 1.01 lbs. of sodium aluminosilicate of the Y type (47.5 percent solids) were slurried in 8.95 lbs. of water, and this slurry was then thoroughly dispersed in solution 1), forming a solution having a Sp. Gr. of 1.203 at 80°F., and
3. 1.98 lbs. of sulfuric acid (97 percent) and 4.23 lbs. of aluminum sulfate $(Al_2(SO_4)_3 \cdot 18 H_2O)$ were dissolved in 57.10 lbs. of water.

The solutions and slurries prepared as described above, were then mixed together continuously through a mixing nozzle with 428 cc/min of the silicate solution containing dispersed Y aluminosilicate at 65°F being added to 436 cc/min. of the acid-alum solution at 41°F. This mixture formed a hydrosol having a pH of 8.5 and a gel time of 3.3 seconds at 65°F. The hydrosol was then made into beads of hydrogel by being formed into droplets which were passed through a column containing a liquid setting medium.

The calculated composition on a dry basis at this point was as follows: 74.99 wt. percent silica-alumina matrix (93.8 wt. percent $SiO_2$ - 6.11 wt. percent $Al_2O_3$) and 25 wt. percent added fines of which 6.07 wt. percent was sodium aluminosilicate of the Y type and 18.93 wt. percent was clay.

The beads prepared in this manner were ion-exchanged with a 2 percent rare earth chloride solution ($RECl_3 \cdot 6H_2O$) for 16 hours using onehalf volume of solution per volume of hydrogel and were then subjected to a continuous ion-exchange with a 1.4 percent $(NH_4)_2SO_4$ solution for 24 hours. The exchanged hydrogel beads were next washed, homogenized in water, and spray dried to yield microspheres of fluid size range.

EXAMPLE 3

A fluid catalyst was prepared as in Example 2 except that the hydrogel beads were recontacted with a 0.25 wt. percent $RECl_3 \cdot 6H_2O$ solution for 4 hours, after the $(NH_4)_2SO_4$ ion-exchange and the washing operations of Example 2. The beads were then washed free of chloride and sulfate ions, homogenized and spray dried to form fluid particles as in Example 2.

EXAMPLE 4

Solutions and slurries were prepared in the following manner:
1. 15.32 lbs. of sodium silicate (N Brand - 28.9 wt. percent $SiO_2$) were dissolved in 7.72 lbs. of water and 0.725 of McNamee clay (87 percent solids) were then dispersed in this solution,
2. 1.24 lbs. 13X sodium aluminosilicate (55.8 percent solids) and 0.315 lbs. 4A sodium aluminosilicate (100 percent solids) were slurried in 7.08 lbs. of water. This slurry was then thoroughly dispersed in solution 1), forming a solution having a Sp. Gr. of 1.193 at 83°F., and
3. 1.98 lbs. of sulfuric acid (97 percent) and 4.23 of aluminum sulfate $(Al_2(SO_4)_3 \cdot 18 H_2O)$ were dissolved in 57.1 lbs. of water.

The above solutions were mixed through a mixing nozzle by adding 460 cc/min of the silicate solution containing dispersed clay and X and A aluminosilicates at 70°F to 436 cc/min of the acid-alum solution at 40°F forming a hydrosol having a pH of 8.5 and having a gel time of 3.0 seconds at 65°F.

Droplets of the hydrosol were then formed and passed through a column of setting liquid to form hydrogel beads. The hydrogel beads were then subjected to ion-exchange by contact with a 2 wt. percent solution of rare earth chlorides $(REC)_3 \cdot 6H_2O)$ for 16 hours using one-half volume of solution per volume of hydrogel beads. Following the rare earth ion-exchange treatment, the beads were subjected to continuous ion-exchange with a 1 percent NH₄Cl solution for 24 hours and were then washed to remove chloride ions. The wet hydrogel was then homogenized and spray dried to yield particles of fluid size.

Another method for producing composite superactive fluid catalysts and constituting a major embodiment of the present invention comprises incorporating the crystalline aluminosilicate into a synthetic gel, such as a silica-alumina gel, which is produced by precipitation.

One such method generally comprises forming a silica gel by neutralizing an alkali metal silicate solution with an acid while maintaining the pH of the gel on the alkaline side. Sulfuric, acetic, hydrochloric, carbonic and other acid solutions may be used to neutralize the silicate solution. The silica hydrogel is then mixed with an aqueous acidic solution of a salt capable of forming alumina. Hydrous alumina is then precipitated within the silica gel to form a silica-alumina gel. After precipitation, the gel is recovered and formed into fluidizable particles, such as microspheres, by spray forming, spray drying or other procedures.

According to conventional processing, the silica-alumina gel produced according to this method is recovered by filtering and it may then be washed prior to being sprayed or otherwise formed into fluid particles. Some processes omit the washing step prior to spraying.

The particles may also be washed after being sprayed to remove residual ions, such as sodium or sulfate ions, and they then may be subjected to a further drying step.

As a modification of this method, the alumina may be precipitated in the pores of the silica gel from solutions of salts in which aluminum is present in the cation, such as aluminum sulfate, and also form solutions of salts in which aluminum is present in the anion, such as sodium or potassium aluminate. The use of separate solutions of this type results in a double precipitation of alumina within the silica gel.

The crystalline aluminosilicate particles may be incorporated into the silica-alumina gel matrix at any stage prior to the formation of the final composite particles. The preferred method for incorporating the superactive component comprises adding a slurry of crystalline alumino-silicate particles to the alkali metal silicate solution. However, good results are also obtained by addition of the crystalline aluminosilicate particles during subsequent stages of the process.

For example, the crystalline aluminosilicate particles may be added (1) with the acid solution, (2) to the acidified silicate solution before it has set to a gel, (3) to the silica hydrogel, after it has been precipitated, (4) to the silica gel, after addition of the aluminum salt solution, (5) to the silica gel, after precipitation of hydrous alumina within the pores of the silica-gel, (6) to the silica-alumina gel after recovery by filtration, and (7) to the silica-alumina gel, after filtering and washing, in those processes employing a washing step prior to spraying.

The fluid size particles produced by this method may also be subject to one or more ion-exchange treatments after they have been formed. Where such post-exchange treatment is employed, the catalyst particles, such as sprayed microspheres, are ordinarily washed to remove residual ions from the exchange treatment and are then dried.

The above-described method for producing superactive catalysts according to the present invention will be better understood in the light of the following detailed examples which illustrate this method.

EXAMPLE 5

Particles of a rare earth exchanged synthetic faujasite of the Y type, the original metal cations of which are about 90 percent replaced by rare earth metal cations, are slurried in 10 gallons of water. The amount of crystalline aluminosilicate in the slurry is calculated to yield a final composite catalyst product containing about 7.0 percent of superactive component.

Next, 2 gallons of sodium silicate solution, containing 28.6 percent $SiO_2$ are thoroughly mixed with the slurry of crystalline aluminosilicate for a period of 1 hour at 88°F.

To the silicate solution is then added over a period of 35 minutes 0.71 gallons of a 33 percent solution of sulfuric acid and 0.642 gallons of an aluminum sulfate solution containing 7.8 percent $Al_2O_3$. An aqueous solution of 0.165 gallons of sodium aluminate containing 23.6 percent $Al_2O_3$ is then mixed with an additional quantity of 0.66 gallons of water. The sodium aluminate solution is added to the previously prepared mixture to provide a final pH in the range of 5.5 to 6.0.

The resulting precipitated hydrogel is then pumped out of the reaction vessel and is filtered on drum filters. The filter cake is then spray dried in hot air to form microspheres of catalyst of fluid size.

EXAMPLE 6

Catalyst is prepared as in Example 5 except that, after spray drying, the microspheres are ion-exchanged with a 2 wt. percent solution of rare earth chlorides $(REC)_3 \cdot 6H_2O$ for 16 hours using one-half volume of solution per volume of microspheres.

The microspheres are then washed to remove chloride ions and are dried at about 300° F.

The fluid catalysts of the present invention may also be produced by utilizing a hydrosol rather than a hydrogel. For example, fresh alumino-silicate sieve alone or with recycle fines of a weight mean average particle diameter of from 0.1 to 20.0 microns may be dispersed in a silica sol produced by adding ammonium hydroxide to a silica hydrogel under atmospheric pressure. The dispersed aluminosilicate and silica hydrosol may then be spray dried to produce fluid catalyst particles in the form of microspheres.

Another primary method for preparing the catalysts of the present invention comprises mixing active aluminosilicate particles with matrix particles in an aqueous slurry and spraying the slurry to form fluid size particles.

The following Table 1 contains a number of examples of various combinations of active and matrix components which may be satisfactorily formed into highly useful fluid catalysts by this method. It is, of course, contemplated that various aluminosilicate components or mixtures thereof may be employed in the slurries.

A preferred method for producing the catalysts of the following Table comprises physically mixing the aluminosilicate, such as a rare earth exchanged synthetic faujasite, with particles of the matrix, such as clay or silica-alumina hydrogel and spray drying the resulting slurry. This general procedure was followed in preparing the catalysts of each of the Examples appearing in the following Table 1.

TABLE 1

EXAMPLES OF CATALYSTS PREPARED BY SPRAY DRYING

| EXAMPLE NUMBER | ACTIVE COMPONENT | MATRIX COMPONENT |
|---|---|---|
| 1. | 7.5% steamed rare earth exchanged synthetic faujasite | 92.5% EPK Florida Kaolin |
| 2. | 7.5% dried rare earth exchanged synthetic faujasite | 92.5% EPK Florida Kaolin |
| 3. | 5% dried rare earth exchanged synthetic faujasite | 95.0% EPK Florida Kaolin |
| 4. | 7.5% dried rare earth exchanged synthetic faujasite | 92.5% EPK Florida Kaolin calcined at 1600°F. |
| 5. | 7.5% dried rare earth exchanged synthetic faujasite | 92.5% EPK Florida Kaolin plus 0.8% tetrapotassium pyrophosphate as dispersant |
| 6. | 7.5% rare earth exchanged synthetic faujasite | 30% clay 62.5% silica-alumina gel |
| 7. | 7.5% rare earth exchanged synthetic faujasite | 66% clay 26.5% silica-alumina gel homogenized prior to spray drying |
| 8. | 7.5% rare earth exchanged synthetic faujasite | 92.5% silica-alumina gel |
| 9. | 7.5% rare earth exchanged synthetic faujasite | 92.5% silica-alumina gel containing 16% of 4 micron silica-alumina gel fines |
| 10. | 7.5% rare earth exchanged synthetic faujasite | 92.5% of silica-alumina gel and 200 ppm of phenol phonol ethylene oxide polymer surfactant (Renex 690 – Atlas Powder Company) |
| 11. | 7.5% steamed rare earth exchanged synthetic faujasite | 92.5% silica-alumina gel containing 16% of 4 micron silica-alumina gel fines |
| 12. | 7.5% rare earth exchanged synthetic faujasite | 92.5% silica-alumina gel containing 8% of 4 micron silica-alumina gel fines |
| 13. | 7.5% rare earth exchanged synthetic faujasite | 92.5% silica-alumina gel containing 16% of 4 micron silica-alumina gel fines |
| 14. | 7.5% rare earth exchanged synthetic faujasite (1 micron size) | 92.5% silica-alumina hydrogel |
| 15. | 7.5% of a rare earth exchanged synthetic faujasite, post-exchanged with an aqueous solution of rare earth trichloride ($RECl_3 \cdot 6H_2O$) after compositing | 92.5% silica-alumina |
| 16. | 7.5% of a rare earth exchanged synthetic faujasite. | 92.5% silica-alumina hydrogel |
| 17. | 10% rare earth exchanged synthetic faujasite | 90% silica-alumina gel |
| 18. | 7.5% rare earth exchanged synthetic faujasite | 92.5% silica-alumina gel containing 16% of 4 micron silica-alumina gel |
| 19. | 20% rare earth exchanged synthetic faujasite calcined 3 hours at 1100°F | 80% silica-alumina hydrogel |
| 20. | 40% rare earth exchanged synthetic faujasite calcined 3 hours at 1100°F | 60% silica-alumina hydrogel |
| 21. | 80% rare earth exchanged synthetic faujasite calcined 3 hours at 1100°F | 20% silica-alumina hydrogel |
| 22. | 7.5% rare earth exchanged synthetic faujasite steamed for 24 hours at 1200°F and 15 psig | 52.5% Silica gel 40% Kaolin |
| 23. | 7.5% rare earth exchanged synthetic faujasite steamed for 24 hours at 1200°F and 15 psig | 92.5% Alumina gel |

The ability of mixed slurries of clay and aluminosilicate particles to be spray dried may be greatly enhanced by the addition of a dispersant, such as tetrapotassium pyrophosphate, or surfactant, as in Examples 5 and 10 of Table 1. The use of such materials enables slurries of much higher solids content to be satisfactorily sprayed with a corresponding increase in yield. The use of such dispersants also improves the uniformity in particle size obtained by spray drying. It is also useful to spray dry slurries of aluminosilicate and matrix particles including dispersant agents with the addition of a binding agent to produce particles having increased hardness.

In preparing catalysts by slurrying and spraying aluminosilicate and matrix components, the practice used in producing catalysts according to the method of Example 1, may also be used to advantage, i.e., recycled fines from the spray drying chamber or elsewhere may be ground to the required size and then incorporated into the aluminosilicate-matrix slurry.

It has also been found to be highly advantageous to pump the slurries of high solids content directly from an homogenizer, such as a sonic or supersonic homogenizer, to the spray nozzle so that there is minimum hold up and little opportunity for the material to set up and plug the nozzle before it is sprayed.

It has also been found to be generally advantageous to dry crystalline aluminosilicates slowly since this preserves the crystallinity and hence the catalytic characteristics of such materials. The following Table 2 contains a comparison of the relative crystallinity of crystalline aluminosilicates dried slowly, as in an atmosphere of steam, and dried rapidly, as by being sprayed directly onto a hot plate. Catalysts dried by both methods were subjected to further heating for 2 hours at 65-0°F. and their relative crystallinity was then measured by an X-ray diffraction technique.

TABLE 2

COMPARISON OF RELATIVE CRYSTALLINITY

| Catalyst | Relative Crystallinity When Dried on Hot Plate | Relative Crystallinity When Dried in Steam |
|---|---|---|
| 1. 7% rare earth exchanged synthetic faujasite and 93% Georgia Kaolin prepared by slurrying in water and drying. | 14.8 | 20 |
| 2. Composite catalyst of 7.5% rare earth exchanged synthetic faujasite and 92.5% silica-alumina gel | 1.6 | 11.3 |
| 3. Composite catalysts of 7.5% rare earth exchanged synthetic faujasite and 92.5% silica-alumina gel ion-exchanged with rare earth chloride solution after compositing | 8.6 | 11.1 |

Further studies have shown that air or steam tempering of the aluminosilicate component, such as rare earth exchanged synthetic faujasite prior to mixing with the matrix, such as a silica-alumina gel, also improves the crystallinity retention.

Another method for preserving crystallinity in fluid catalysts produced by the above-described methods involving spray drying or other rapid drying comprises incorporating into the catalyst composition a relaxing agent, such as non-shrinking solids. The solids may be added in the form of particles of up to 40 microns with aluminosilicate particles of up to 7 microns, the non-shrinking particles being larger than the aluminosilicate particles. It is believed that the loss of activity during the rapid drying of aluminosilicate containing fluid catalysts, especially during spray drying, stems from the destruction of the crystalline structure of the aluminosilicate due to strong compressive forces exerted on it. According to this method, from about 20 percent to 30 percent by volume of from 4 to 5 micron diameter calcined alumina particles may be incorporated into the slurry of rare earth exchanged synthetic faujasite and silica-alumina gel, the aluminosilicate particles being on the order of from 1 to 3 microns in diameter. Upon drying, the alumina particles exhibit substantially no shrinkage and materially reduce the compression on the aluminosilicate particles.

An increase in crystallinity retention of the aluminosilicate is also generally realized when using clay rather than silica-alumina gel as the matrix material prior to spray drying. The clay tends to reduce internal pressures during drying due to its larger pores and lower water content.

It has also been found that the loss of crystallinity of the aluminosilicate during catalyst-forming processes involving rapid drying, such as spray drying, can be reduced by use of a particular method of drying. For example, an aqueous slurry of rare earth exchanged synthetic faujasite and silica-alumina gel may first be spray dried to a minimum water content by weight (based on dry solids) and then the partially dried product may be completely dried by another spray drying or oven drying operation or by introduction into the fluid catalytic reactor.

It has also been found that the attrition resistance of fluid catalysts prepared from slurries of clay and aluminosilicate may be improved by adding a small amount of sodium hydroxide to the slurry. Such an addition modifies the clay surface and improves the attrition resistance of the product. The same result may also be obtained by incorporating a small amount of a chelating agent into the composition to remove alumina from the clay structure so that it may serve as a binder in the composite.

Fluid catalyst particles may also be prepared by compositing fines of a crystalline aluminosilicate with organic and inorganic binders. For example from 5 percent to 40 percent fines of from 1 to 5 microns particle diameter of a rare earth exchanged synthetic faujasite may be dispersed in a sulfonated polystyrene resin by solvent or emulsification techniques. The organic matrix material may also have a catalytic function in addition to the catalytic activity of the aluminosilicate. The dispersion of aluminosilicate in an organic matrix may then be reduced to fluid catalyst particles by being sprayed from a solution or emulsion. Particles of the desired size may also be formed from the dispersion by pelleting, granulating and agglomerating techniques.

The fluid catalysts of the present invention may also be produced by a method comprising physically mixing an aluminosilicate component with a matrix component in the form of a wet cake. The cake may be dried, ground, and screened to size or may be processed as a slurry and spray dried. The matrix may be clay, a gel, or a cogel, such as silica-alumina gel, or similar binder material.

The present fluid catalysts may also be produced by wetting aluminosilicate particles with a gel-forming solution and then causing the gel to set or form around the superactive core particle.

Among the most important methods for producing fluid catalysts according to the present invention, there is included the incorporation of finely divided aluminosilicate catalytic material into a matrix of relatively inactive material. Such compositing may be accomplished in a number of ways. One satisfactory technique comprises balling powdered alumino-silicate with a binder such as clay, silica-alumina, organic materials, including natural and synthetic plastics and resins, inorganic materials including silicate solutions and the like.

Another method for compositing the aluminosilicate with relatively inactive material to produce suitable fluid catalysts comprises mechanically compacting the aluminosilicate with the matrix material. This may be accomplished by mixing powders of the superactive material and matrix and then compacting them under the influence of heat and/or pressure to produce self-supporting masses.

The fluid catalysts of the present invention have been found to be highly useful in the conversion of hydrocarbon charge material into hydrocarbon products of lower average molecular weight.

Fluid catalysts of the present type, comprising crystalline aluminosilicates, may be prepared so as to provide a wide range of activities. Thus, with such catalysts, the opportunity is now afforded to tailor the properties of the catalyst to suit the reactor conditions, the nature of the hydrocarbon feedstock and the desired products.

The present fluid catalysts have also been found to possess very superior selectivity as compared with conventional catalysts. This ability to convert a charge to yield a high proportion of valuable products, generally $C_5+$ gasoline, and a reduced proportion of less valuable products, such as dry gas and coke, is a most important factor in catalytic cracking.

In order to demonstrate the advantage of fluid catalytic cracking with the new catalysts, a number of pilot plant fluid cracking runs were made, some with a conventional silica-alumina gel catalyst and others with the catalyst prepared according to Example 1.

The results of three runs with the conventional catalyst and of six runs with the catalyst prepared according to Example 1 are presented in Table 3.

The data of Table 3 indicates that the crystalline aluminosilicate composite catalyst is considerably more active than normal commercial equilibrium silica-alumina gel catalysts. To obtain the same conversion level with the silica-alumina gel catalyst, it is necessary to operate at a much higher severity factor than with the fluid aluminosilicate catalysts. Severity factor as used herein refers to C/O/WHSV.

The results of cracking runs of the same per cent conversion also clearly show that a fluid catalyst comprising about 3 to 5 percent of a rare earth exchanged synthetic faujasite dispersed in a silica-alumina gel matrix, as prepared by the method of Example 1, is considerably more selective than a conventional synthetic silica-alumina gel catalyst. At a given conversion level, less coke and gas are produced, butane production is approximately the same and gasoline yields are in the range of from 6 to 8 volume per cent higher. The following Table 4 summarizes and compares the results obtained with each catalyst at 70 volume per cent conversion.

TABLE 3

FLUID CATALYST CRACKING OF 29° API MID-CONTINENT GAS OIL

| Catalyst | Fluid Silica-Alumina | | | | Fluid Crystalline Aluminosilicate Catalyst:* | | | | |
|---|---|---|---|---|---|---|---|---|---|
| Run No. | 1 | 2 | 3 | 4 | 5 | 6 | 7 | 8 | 9 |
| Catalyst Properties | | | | | | | | | |
| Relative Activity | | 0.15 | | | | | 0.44 | | |
| Carbon Producing Factor | | 1.30 | | | | | 0.81 | | |
| Hydrogen Producing Factor | | 4.3 | | | | | 0.4 | | |
| Reactor Operating Conditions | | | | | | | | | |
| Temperature – °F | | | | 900 | | | | | |
| Pressure – psig | | | | 10 | | | | | |
| Dispersion Steam – Wt. % | | | | 10 | | | | | |
| Wt. Oil/Hr./Wt. Catalyst Bed | 1.5 | 0.69 | 0.27 | 3.3 | 2.8 | 3.8 | 3.8 | 6.3 | 2.9 |
| Catalyst/Oil – Weight | | | | 10 | | | | | |
| Severity Factor (C/O/WHSV) | 6.7 | 14.5 | 37.7 | 3.0 | 3.6 | 2.6 | 2.6 | 1.6 | 3.5 |
| Carbon on Regen. Catalyst – Wt. % | | 0.50 | | | 0.20 | | | 0.50 | |
| Carbon on Spent Catalyst – Wt. % | 0.95 | 1.08 | 1.69 | 0.76 | 0.99 | 0.79 | 0.80 | 1.02 | 1.19 |
| Product Yields | | | | | | | | | |
| Conversion (430°F) – Vol. % | 50.7 | 55.3 | 69.8 | 68.1 | 71.2 | 68.4 | 68.7 | 64.3 | 70.6 |
| Coke (90% Carbon) – Wt. % | 4.5 | 5.8 | 11.9 | 5.6 | 7.9 | 5.9 | 6.0 | 5.2 | 6.9 |
| Dry Gas – $H_2$ to $C_2$ – Wt. % | 1.5 | 2.2 | 3.7 | 2.0 | 2.1 | 2.0 | 2.2 | 1.9 | 2.5 |
| Propylene-Propane – Wt. % | 4.2 | 5.3 | 7.3 | 7.1 | 6.8 | 6.6 | 6.7 | 6.4 | 7.7 |
| Butene-Butane Fraction – Vol. % | 10.3 | 11.8 | 16.4 | 18.2 | 16.7 | 16.9 | 17.1 | 15.5 | 18.9 |
| $C_5$-430°F VT Gasoline – Vol. % | 38.7 | 40.0 | 40.6 | 46.3 | 48.9 | 48.4 | 48.4 | 46.3 | 46.2 |
| Total Cycle Oil (430°F) – Vol. % | 49.3 | 44.7 | 30.2 | 31.9 | 28.8 | 31.6 | 31.3 | 35.7 | 29.4 |
| Liquid Recovery ($C_4$+) – Vol. % | 98.3 | 96.5 | 87.2 | 96.4 | 94.4 | 96.9 | 96.8 | 97.5 | 94.5 |

*Composite comprising 3%–5% rare earth exchanged synthetic faujasite dispersed in silica-alumina (10% $Al_2O_3$) gel.

TABLE 4

| Catalyst | Fluid Silica-Alumina Gel Catalyst | Fluid Crystalline Alumino-Silicate Composite Catalyst | |
|---|---|---|---|
| Run No. | 1 | 2 | 3 |
| Relative Activity | 0.15 | 0.44 | |
| Carbon Factor | 1.3 | 0.8 | |
| Conversion – Vol % | | 70 | |
| Temperature – °F | | 900 | |
| Catalyst/Oil | | 10 | |
| Carbon on Regen. Cat – Wt. % | 0.5 | 0.2 | 0.5 |
| Severity Factor C/O/WHSV) | 50 | 3 | 3 |
| Coke – Wt % | 12.0 | 6.4 | 6.8 |
| Dry Gas ($C_3$ & Ltr. –Wt.) | 11.2 | 9.0 | 9.8 |
| Butanes – Vol % | 16.5 | 17.5 | 18.2 |
| Gasoline – Vol % | 40.6 | 48.6 | 46.8 |

Regeneration rates for the superactive catalysts were also found to be equal to or better than those for silica-alumina under the same conditions.

Bench scale cracking runs were also conducted with a superactive catalyst of the same composition as the catalyst of Example 1 but crushed to fluid size rather than spray dried to microspheres. This crushed catalyst and spray dried microsperiodal composite catalyst comprising crystalline aluminosilicate dispersed in silica-alumina gel were compared with conventional silica-alumina gel catalyst in the fluid cracking of Light, Wide Cut and Heavy Mid-Continent Gas Oil feed stocks. Hereafter, the feed stocks are referred to as Light MCGO, Wide Cut MCGO and Heavy MCGO, respectively.

With the Light MCGO, the new catalyst in the form of crushed particles gives about 12 percent by weight more of $C_5$ + gasoline at 50 percent weight conversion. This gasoline advantage is even greater at higher conversions. The coke yield for the new catalyst in either the form of crushed particles or spray dried microspheres is much lower than the coke yield with conventional silica-alumina gel fluid cracking catalysts. The reduction in coke laydown is on the order of 70 to 75 percent.

With the Wide Cut MCGO, the catalyst in the form of crushed particles gives an increase of about 4.5 percent by weight of $C_5$ gasoline at 40 percent weight conversion as compared with the same level of conversion over conventional fluid silica-alumina catalyst, and, as with the Light MCGO, the gasoline advantage increases with increasing conversion. The coke yield for the new catalyst in the form of powdered or crushed particles is also about 50 percent lower than that obtained with the silica-alumina.

Similar advantage is also realized in cracking Heavy Cut Mid-Continent Gas Oil charge with the fluid catalysts of the present invention.

In addition to the cracking of hydrocarbons, as previously described, the fluid catalysts of the present invention have wide utility in other processes employing fluid catalysts, such as isomerization, alkylation, polymerization, hydrogen transfer, hydration, dehydration, disproportionation, dealkylation, hydrocracking and in other processes and reactions involving the conversion of organic compounds.

It will be apparent to persons skilled in the art that the invention described herein and the specific examples disclosed may be varied and numerous substitutions of equivalents may be made without departing from the spirit of the invention or from the scope of the following claims.

What is claimed is:

1. A process for preparing a crystalline aluminosilicate zeolite catalyst comprising the steps of:
   a. exchanging a crystalline aluminosilicate zeolite with a solution containing at least one exchangeable cation to at least partially replace the original cation;
   b. heating the exchanged zeolite at a temperature from 500°F to 1,600°F;
   c. compositing the resulting zeolite with a porous matrix material; and
   d. contacting the resultant composite with a solution containing at least one exchangeable cation other than the original cation.

2. The process of claim 1 wherein the matrix material is at least one of a member selected from the group consisting of clay, alumina, a hydrated metal oxide, silica gel, alumina gel, and silica-alumina gel.

3. The process of claim 1 wherein the matrix is a composite of clay and inorganic oxide gel.

4. The process of claim 1 in which the first exchange is effected with a solution containing rare earth metal cation.

5. The process of claim 1 in which the zeolite is a synthetic faujasite.

6. The process of claim 5 wherein the zeolite is type X.

7. The process of claim 5 wherein the zeolite is type Y.

8. The process of claim 1 wherein the original cation is sodium.

9. The process of claim 1 wherein the heating is performed in an atmosphere containing from about 5 to 100 percent steam.

10. A process for preparing a zeolite catalyst material characterized by a stable structure in which crystallinity loss is minimized during subsequent processing steps, such as rapid drying as in spray drying, wet processing, steaming and aging which comprises:
    a. exchanging the zeolite with a solution of a salt of at least one desired metal cation to remove at least 75 percent of the original cation content,
    b. drying and heating the exchanged zeolite at a temperature of 500° to 1,600°F,
    c. compositing the heated zeolite with porous amorphous matrix material and subjecting the resulting composite to ion exchange and
    d. washing, drying and recovering the product.

11. A method according to claim 10 wherein the final exchange is with an ammonium salt.

12. A method according to claim 10 wherein the porous amorphous matrix material is a silica hydrogel.

13. A method according to claim 12 wherein the porous amorphous matrix material is silica-alumina.

14. A method according to claim 12 wherein the original cation of the zeolite is an alkali metal cation.

15. A process for preparing a crystalline aluminosilicate zeolite comprising the steps of:
    a. exchanging the crystalline aluminosilicate zeolite with a solution containing rare earth cations to at least partially replace the original cation;
    b. heating the exchanged zeolite at a temperature from 500°F to 1600°F;
    c. compositing the resulting zeolite with a porous matrix material; and
    d. contacting the resulting composite with a solution containing rare earth cations.

* * * * *

UNITED STATES PATENT OFFICE
CERTIFICATE OF CORRECTION

Patent No. 3816342                              Dated June 11, 1974

Inventor(s) Charles J. Plank, Edward J. Rosinski

It is certified that error appears in the above-identified patent and that said Letters Patent are hereby corrected as shown below:

In column 3, line 28 "alluminosiliontes" should be --aluminosilicates--. In column 4, line 17 "alluminosilicate" should be --aluminosilicate--. In column 7, line 36 "Pa" should be --Ba--. In column 7, line 38 "Mo" should be --Ho--. In column 7, line 38 "Ta" should be --Tm--. In column 10, line 29 "of" should be --in--.

In column 13, line 44 "5" should be --6%--. In column 14, line 66 "(REC)$_3$" should be --RECl$_3$--. In column 15, line 37 "form" should be --from--. In column 15, line 43 "sliica" should be --silica--. In column 16, line 19 "33" should be --35--. In column 16, line 37 "(REC)$_3$ should be --RECl$_3$--.

UNITED STATES PATENT OFFICE
CERTIFICATE OF CORRECTION

PAGE - 2

Patent No. 3816342

Dated June 11, 1974

Inventor(s) Charles J. Plank, Edward J. Rosinski

It is certified that error appears in the above-identified patent and that said Letters Patent are hereby corrected as shown below:

Table 3 should appear as follows instead of as in the Patent:

TABLE 3

FLUID CATALYST CRACKING OF 29° API MID-CONTINENT GAS OIL

| Catalyst | Fluid Silica-Alumina | | | Fluid Crystalline Aluminosilicate Catalyst:[*] | | | | | |
|---|---|---|---|---|---|---|---|---|---|
| Run No. | 1 | 2 | 3 | 4 | 5 | 6 | 7 | 8 | 9 |
| Catalyst Properties | | | | | | | | | |
| Relative Activity | — | 0.15 | — | — | — | — | — | 0.44 | — |
| Carbon Producing Factor | — | 1.30 | — | — | — | — | — | 0.81 | — |
| Hydrogen Producing Factor | — | 4.3 | — | — | — | — | — | 0.4 | — |
| Reactor Operating Conditions | | | | | | | | | |
| Temperature - °F | | | | 900 | | | | | |
| Pressure - psig | | | | 10 | | | | | |
| Dispersion Steam - Wt. % | | | | 10 | | | | | |
| Wt. Oil/Hr./Wt. Catalyst Bed | 1.5 | 0.69 | 0.27 | 3.3 | 2.8 | 3.8 | 3.8 | 6.3 | 2.9 |
| Catalyst/Oil - Weight | | | | 10 | | | | | |
| Severity Factor (C/O/WHSV) | 6.7 | 14.5 | 37.7 | 3.0 | 3.6 | 2.6 | 2.6 | 1.6 | 3.5 |
| Carbon on Regen. Catalyst - Wt. % | — | 0.50 | — | — | — | 0.20 | — | — | 0.50 | — |
| Carbon on Spent Catalyst - Wt. % | 0.95 | 1.08 | 1.69 | 0.76 | 0.99 | 0.79 | 0.80 | 1.02 | 1.19 |
| Product Yields | | | | | | | | | |
| Conversion (430°F) - Vol. % | 50.7 | 55.3 | 69.8 | 68.1 | 71.2 | 68.4 | 68.7 | 64.3 | 70.6 |
| Coke (90% Carbon) - Wt. % | 4.5 | 5.8 | 11.9 | 5.6 | 7.9 | 5.9 | 6.0 | 5.2 | 6.9 |
| Dry Gas - H₂ to C₃ - Wt. % | 1.5 | 2.2 | 3.7 | 2.0 | 2.1 | 2.0 | 2.2 | 1.9 | 2.5 |
| Propylene-Propane - Wt. % | 4.2 | 5.3 | 7.3 | 7.1 | 6.8 | 6.6 | 6.7 | 6.4 | 7.7 |
| Butene-Butane Fraction - Vol. % | 10.3 | 11.8 | 16.4 | 18.2 | 16.7 | 16.9 | 17.1 | 15.5 | 18.9 |
| C₅-430°F VT Gasoline - Vol. % | 38.7 | 40.0 | 40.6 | 46.3 | 48.9 | 48.4 | 48.4 | 46.3 | 46.2 |
| Total Cycle Oil (430°F) - Vol. % | 49.3 | 44.7 | 30.2 | 31.9 | 28.8 | 31.6 | 31.3 | 35.7 | 29.4 |
| Liquid Recovery (C₄+) - Vol. % | 98.3 | 96.5 | 87.2 | 96.4 | 94.4 | 96.9 | 96.8 | 97.5 | 94.5 |

[*]Composite comprising 3%-5% rare earth exchanged synthetic faujasite dispersed in silica-alumina (10% Al₂O₃) gel.

UNITED STATES PATENT OFFICE
CERTIFICATE OF CORRECTION

Patent No. 3816342   Dated June 11, 1974

Inventor(s) Charles J. Plank, Edward J. Rosinski

It is certified that error appears in the above-identified patent and that said Letters Patent are hereby corrected as shown below:

Table 4 should appear as follows instead of as in the Patent:

TABLE 4

| Catalyst | Fluid Silica-Alumina Gel Catalyst | Fluid Crystalline Alumino-Silicate Composite Catalyst | |
|---|---|---|---|
| Run No. | 1 | 2 | 3 |
| Relative Activity | 0.15 | 0.44 | 0.8 |
| Carbon Factor | 1.3 | →  | → |
| Conversion - Vol % | ← 70 | — | → |
| Temperature - °F | ← 900 | — | → |
| Catalyst/Oil | ← 10 | — | → |
| Carbon on Regen. Cat - Wt. % | 0.5 | 0.2 | 0.5 |
| Severity Factor (C/O/WHSV) | 50 | 3 | 3 |
| Coke - Wt % | 12.0 | 6.4 | 6.8 |
| Dry Gas (C$_3$ & Ltr. -Wt.) | 11.2 | 9.0 | 9.8 |
| Butanes - Vol % | 16.5 | 17.5 | 18.2 |
| Gasoline - Vol % | 40.6 | 48.6 | 46.8 |

Signed and sealed this 1st day of October 1974.

(SEAL)
Attest:

McCOY M. GIBSON JR.
Attesting Officer

C. MARSHALL DANN
Commissioner of Patents